2,743,282

PRODUCTION OF PURE γ-HEXACHLOROCYCLOHEXANE

Karl Thönnessen, Ludwigshafen (Rhine), Germany, assignor to the firm Dr. F. Raschig, G. m. b. H., Ludwigshafen (Rhine), Germany No Drawing. Application May 21, 1952,
Serial No. 289,194

Claims priority, application Germany May 26, 1951

2 Claims. (Cl. 260—340.6)

As is known, during the reaction of chlorine on benzene under the influence of light sources a mixture of various isomers of hexachlorocyclohexane is formed. It is furthermore known, that of these isomeric hexachlorocyclohexanes practically only the γ-isomer has an insecticidal action. It is therefore a technical problem to enrich the γ-isomer from the mixture resulting from the synthesis which is contained therein from 10 to 12% or to obtain it therefrom in pure form. Various processes have so far become known for this; for example such an enriching is possible through extraction of the crude mixture of isomers with methanol. As long as one proceeds in an appropriate manner, it is relatively easy, to obtain mixtures of isomers which besides α-hexachlorocyclohexane contain about 60–70% γ-hexachlorocyclohexane. The remaining isomers are mostly only contained as traces in such γ-concentrates. A further enriching of the γ-isomer or its preparation in pure form is as yet only possible in a complicated manner.

The present invention concerns a process for the production of pure γ-hexachlorocyclohexane from mixtures of hexachlorocyclohexane isomers, which contain at least 40% γ-hexachlorocyclohexane.

According to the invention mixtures of hexachlorocyclohexane isomers, which contain at least 40% of γ-hexachlorocyclohexane, are heated with dioxan, a double compound of γ-hexachlorocyclohexane with dioxan being precipitated by cooling, this double compound being separated from the mother liquor in a manner known per se and split into its components.

The process according to the invention is based on the observation, that γ-hexachlorocyclohexane can form a crystallized double compound with dioxan which compound has the composition, $$C_4H_8O_2 \cdot 2C_6H_6Cl_6 (\gamma)$$

It could be shown by thermic analysis, that γ-hexachlorocyclohexane forms with dioxan a double compound of the stated composition. This compound precipitates in crystallized form, when one cools a solution of γ-hexachlorocyclohexane in dioxan produced in the hot. It also precipitates in pure form even then when simultaneously α-hexachlorocyclohexane or other isomeric hexachlorocyclohexanes are dissolved in the dioxan solution. If for example starting from a mixture, consisting of 70% γ- and 30% α-hexachlorocyclohexane, one dissolves this by heating in the required amount of dioxan and then cools, the crystals of the double compound of dioxan with γ-hexachlorocyclohexane again separate in pure form. The amount of dioxan usefully to be employed in the process can be calculated in the following manner:

A mixture of isomers consisting of 60% γ-hexachlorocyclohexane and 40% α-hexachlorocyclohexane is to be separated according to the present invention. Then the amount of dioxan to be used for 1 kg. of this mixture is calculated as follows:

600 g. of γ-hexachlorocyclohexane require on basis of the formula $C_4H_8O_2 \cdot 2C_6H_6Cl_6$ (γ) about 91 g. of dioxan for forming the double compound. The 400 g. of α-hexachlorocyclohexane should during the cooling of the solution to about 10° C. remain in solution, i. e. so much additional dioxan is to be employed, so that this is the case. The solubility of α-hexachlorocyclohexane in dioxan amounts at about 20° C. to about 340 g. in 660 g. of dioxan. Therefore about 780 g. of dioxan are to be employed for the abovementioned 400 g. of α-hexachlorocyclohexane. Therefore a total of 871 g. of dioxan should be employed for 1 kg. of mixed isomers of the abovementioned composition. This amount of dioxan can as a precaution be rounded off upwards to about 900 g., so that during a possible overcooling the α-hexachlorocyclohexane does not also crystallize out.

With an isomer mixture, which consists for example of 75% γ-hexachlorocyclohexane and 25% α-hexachlorocyclohexane the amount of dioxan to be employed for 1 kg. of this mixture works out as follows:

750 g. of γ-hexachlorocyclohexane require approximately 114 g. of dioxan for forming the double compound. 250 g. of α-hexachlorocyclohexane require 485 g. of dioxan in order to remain dissolved during the cooling of the solution. Altogether therefore 599 g. of dioxan should be employed. This amount is somewhat increased for safety's sake, e. g. to 620 g.

In this way one can in a simple manner produce pure γ-hexachlorocyclohexane from mixtures of γ- and α-hexachlorocyclohexane. These mixtures contain preferably about 60–70% of γ-hexachlorocyclohexane and 30–40% of α-hexachlorocyclohexane. The process according to the invention can however also be applied to mixtures, which contain less γ-hexachlorocyclohexane, e. g. 60 or 50%. In this case one naturally obtains a correspondingly lower yield of pure γ-hexachlorocyclohexane. Only with mixtures, which contain about 40% or less γ-hexachlorocyclohexane, is a crystallization of the above described double compound $C_4H_8O_2 \cdot 2C_6H_6Cl_6$ (γ) without simultaneous separation of α-hexachlorocyclohexane crystals and thus a separation of the isomers from each other no longer possible. The process is therefore only applicable to such mixtures of isomers which contain more than about 40% of γ-hexachlorocyclohexane. However, as already mentioned above, as it is easily possible to produce mixtures with about 70% of γ-hexachlorocyclohexane in another manner, the process presents a simple method for the production of pure γ-hexachlorocyclohexane.

The practical carrying out of the process proceeds quite simply. The mixture of isomers is dissolved by heating in the required amount of dioxan and then cooled to about 10° C., so that the compound $C_4H_8O_2 \cdot 2C_6H_6Cl_6$(γ) separates. The separated crystals are separated from the mother liquor in known manner, e. g. by centrifugation.

It has furthermore been found, that the amount of the separating double compound and thus the yield of pure γ-hexachlorocyclohexane can be increased, if during the dissolving of the hexachlorocyclohexane isomers in dioxan such solvents are added, as lower the solubility of the double compound in the mother liquor, but on the other hand practically do not influence the solubility of the α-hexachlorocyclohexane in the mother liquor. Only a few solvents are suitable for this purpose. It was found, that e. g. carbon tetrachloride and above all also light petrol can be used for this purpose. Here it is to be remarked however, that these solvents cannot be added in any desired quantities i. e. the amounts of solvents to be added must only be so measured, that a precipitation of the α-isomer does not occur.

From the double compound obtained one can in a simple way drive off and recover the chemically combined dioxan and recover it e. g. by distillation, so that pure, molten γ-hexachlorocyclohexane remains as residue, which after draining, e. g. in a tin container, hardens to solid crystalline cakes.

As the double compound consists on the one hand of the difficultly volatile γ-hexachlorocyclohexane and on the other hand of the readily volatile dioxan, which has a boiling point of about 100° C., the separation of the double compound into its components occurs directly by distilling off the readily volatile dioxan. This distillation is preferably undertaken in vacuo so that the last remnants of the dioxan can be removed.

The mother liquor resulting from the process can likewise be freed from dioxan by distillation. In this case there remains a melt with about 40% γ-hexachlorocyclohexane and about 60% α-hexachlorocyclohexane. This mixture of isomers can again be converted in known manner e. g. by treating with methanol into an approximately 70% γ-hexachlorocyclohexane.

But one can also effect the decomposition of the double compound e. g. by recrystallizing from a solvent, such for example as methanol or benzene. In this case the pure γ-hexachlorocyclohexane separates in pure form, whilst the dioxan remains dissolved in the solvent.

With the process according to the invention it is possible in a simple manner to decompose an approximately 70% γ-hexachlorocyclohexane in a portion of 100%, γ-hexachlorocyclohexane and a portion of approximately 40% γ-hexachlorocyclohexane. The approximately 40% portion can again be converted in a manner known per se into 70% γ-hexachlorocyclohexane. A method readily available for this purpose to the expert consists therein, that the 40% product is recrystallized with the aid of a solvent, e. g. methanol. If suitable working conditions are maintained the losses of dioxan can be kept very low, so that it is possible according to the present process, to obtain pure γ-hexachlorocyclohexane by simple and relatively cheap methods.

The following examples are to explain the invention more clearly without limiting it.

Example 1

1 kg. of a mixture of hexachlorocyclohexane isomers, which consists of about 750 g. of γ- and 250 g. of α-hexachlorocyclohexane, is mixed with 750 g. of dioxan and heated to complete solution. Thereupon the mixture is cooled with stirring to about 10° C., when a plentiful separation of crystals of the compound $$C_4H_8O_2.2C_6H_6Cl_6(\gamma)$$

results. The crystals are separated from the mother liquor by suction which produces about 560 g. of solid substance and about 1160 g. of mother liquor. The crystals are melted and about 60 g. of dioxan are recovered by distillation in vacuo. The residual melt (about 480 g.) solidifies after cooling and consists of pure γ-hexachlorocyclohexane with a melting point of 112–113° C.

The mother liquor is likewise subjected to a vacuum distillation, whereby about 600 g. of dioxan are produced. The residue free of dioxan (about 500 g.) in this case consists of about 50% of γ- and of about 50% α-hexachlorocyclohexane.

Example 2

1 kg. of a mixture of hexachlorocyclohexane isomers, which consists of about 750 g. of γ- and 250 g. of α-hexachlorocyclohexane, is mixed with 620 g. of dioxan and for the rest further worked up as described in Example 1. Then one obtains about 700 g. of pure γ-hexachlorocyclohexane.

This example shows clearly, that the amount of the yield is greatly dependent on the amount of dioxan employed and that it is expedient, not to select this amount of dioxan greater than is absolutely necessary.

Example 3

1 kg. of a mixture of hexachlorocyclohexane isomers, consisting of 600 g. of γ- and 400 g. of α-hexachlorocyclohexane, is mixed with 900 g. of dioxan and heated to complete solution. Thereupon the mixture is cooled with stirring to about 10° C., during which crystals of the compound $C_4H_8O_2.2C_6H_6Cl_6(\gamma)$ separate. The crystals are separated from the mother liquor by suction which produces about 460 g. of solid substance. The dioxan is separated by distillation in accordance with the above examples and one obtains about 400 g. of pure γ-hexachlorocyclohexane.

Example 4

330 kg. of the double compound $C_4H_8O_2.2C_6H_6Cl_6(\gamma)$ are heated in a distillation apparatus during which the apparatus is simultaneously connected to a vacuum pump. The double compound first melts and at a temperature of 100–120° C. 43 kg. of dioxan distill off. The distillation residue consists of molten γ-hexachlorocyclohexane, which is run off liquid into basins, where it then solidifies to solid blocks.

Example 5

1 kg. of the double compounds $C_4H_8O_2.2C_6H_6Cl_6(\gamma)$ is mixed with 3 kg. of methanol and heated until complete solution has taken place. Then about 20 g. of activated carbon are added to remove the last traces of adherent odorous substances and the solution is filtered hot. The clear filtrate is cooled, whereby the γ-hexachlorocyclohexane separates in crystalline form. About 600 g. of pure γ-hexachlorocyclohexane are obtained.

Example 6

1 kg. of a mixture of hexachlorocyclohexane isomers, which consists of about 750 g. of γ-hexachlorocyclohexane and 250 g. of α-hexachlorocyclohexane, is mixed with 700 g. of dioxan and heated to complete solution. Thereupon the mixture is cooled to about 0–10° C. preferably with occasional stirring. Then 500 g. of light petrol of a specific gravity of 0.7 are added. After standing for some time the separated crystals of the double compound $C_4H_8O_2.2C_6H_6Cl_6(\gamma)$ are separated from the mother liquor by suction or centrifuging. About 725 g. of solid double compound and about 1200 g. of mother liquor are obtained. The crystals are melted and the dixan removed therefrom by distillation in vacuo. About 50 g. of dioxan are obtained. The residual melt solidifies after cooling and consists of pure γ-hexachlorocyclohexane. The yield amounts to about 600 g., i. e. about 120 g. more of γ-hexachlorocyclohexane are obtained than in Example 1.

The mother liquor is likewise subjected to vacuum distillation, whereby about 720 g. of a mixture of dioxan and light petrol are obtained, which can be used again in the process. The residue free of dioxan (about 380 g.) consists of about 34% of γ- and 66% of α-hexachlorocyclohexane.

What I claim is:

1. Process for the production of pure γ-hexachlorocyclohexane from mixtures of hexachlorocyclohexane isomers, which contain at least 40% of γ-hexachlorocyclohexane, which comprises heating said mixtures with dioxan to dissolve said γ-isomer and form a double compound with said dioxan, adding thereto a solvent taken from the class consisting of carbon tetrachloride and light petrol in sufficient amount to lower the solubility of the double compound but not to lower the solubility of the α-isomer, cooling the solution to precipitate said double compound, removing the said from the mother liquor.

2. Process for the production of pure γ-hexachlorocyclohexane from mixtures of hexachlorocyclohexane isomers, which contain at least 40% of γ-hexachlorocyclohexane, which comprises heating said mixtures with dioxan to dissolve said γ-isomer and form a double compound with said dioxan, adding thereto a solvent taken from the class consisting of carbon tetrachloride and light petrol in sufficient amount to lower the solubility of the double compound but not to lower the solubility of the α-isomer, cooling the solution to precipitate said double compound, removing the same from the mother liquor, melting said double compound and vaporizing said dioxan, and cooling to solidify the γ-isomer.

References Cited in the file of this patent

UNITED STATES PATENTS

| | | |
|---|---|---|
| 2,438,900 | Cooke | Apr. 6, 1948 |
| 2,673,857 | Tryon | Mar. 30, 1954 |
| 2,673,883 | Tryon | Mar. 30, 1954 |

FOREIGN PATENTS

| | | |
|---|---|---|
| 471,941 | Belgium | Apr. 1947 |

OTHER REFERENCES

Slade: "Chem. and Industry," Oct. 13, 1945, pp. 315–6.